Sept. 30, 1924.
L. DICKERSON
OYSTER PUNCHING DEVICE
Filed Dec. 28, 1923
1,510,313
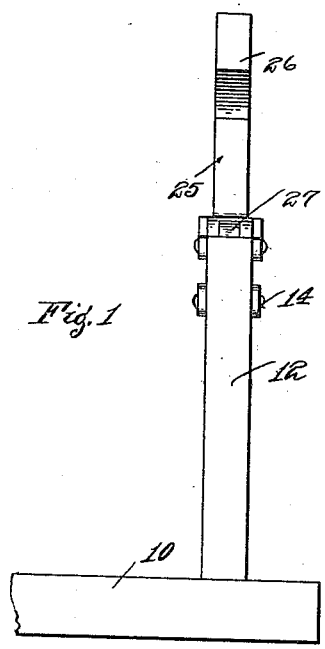
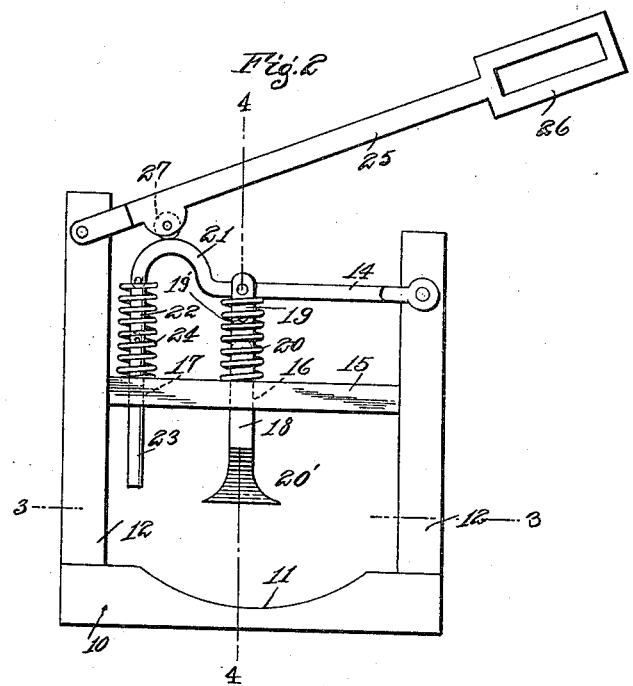
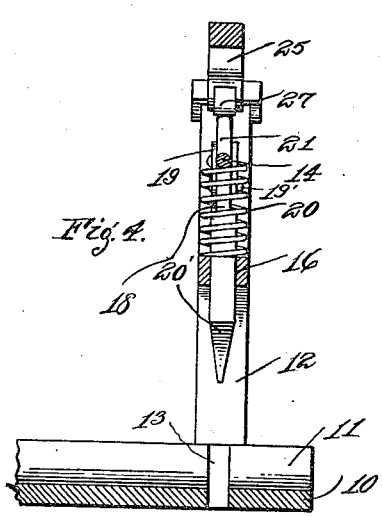
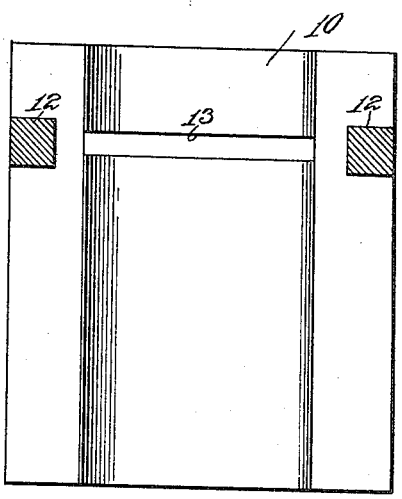
Inventor
Leary Dickerson.
By
Attorney Patented Sept. 30, 1924.

1,510,313

UNITED STATES PATENT OFFICE.

LEARY DICKERSON, OF NESTING, VIRGINIA.

OYSTER-PUNCHING DEVICE.

Application filed December 28, 1923. Serial No. 683,205.

*To all whom it may concern:*

Be it known that I, LEARY DICKERSON, a citizen of the United States, residing at Nesting, in the county of Middlesex, State of Virginia, have invented certain new and useful Improvements in Oyster-Punching Devices; and I do hereby declare the following to be a full, clear, and exact description of the invention, such as will enable others skilled in the art to which it appertains to make and use the same.

This invention relates to new and useful improvements in oyster opening machines, and particularly to machines for breaking off the mouths of the oyster shells to readily permit the introduction of a knife.

One object of the invention is to provide a machine of this character by means of which the operator can easily and quickly break off the mouth of the oyster shell, and pass the oyster, with the thus broken shell, on to another person who inserts a knife into the crack formed at the break in the shell, so that the shell may be separated and the oyster removed.

Another object is to provide a device of this character which will save a great amount of time and labor, in what is known as "shucking" oysters, as considerable time is generally consumed when one person performs the act of breaking the shell and then inserting the knife in the opening.

Furthermore, the machine obviates injury to the hands of the operator, when, in the ordinary method employed, the knife sometimes will slip and cut the operator's hand.

Other objects and advantages will be apparent from the following description when taken in connection with the accompanying drawing.

In the drawing:

Figure 1 is a side elevation of an oyster machine made in accordance with the present invention.

Figure 2 is an end view of the same.

Figure 3 is a horizontal sectional view on the line 3—3 of Figure 2.

Figure 4 is a vertical longitudinal sectional view on the line 4—4 of Figure 2.

Referring particularly to the accompanying drawing, 10 represents the base of the machine which may be formed from any suitable material, and being longitudinally channeled, as shown at 11, for the reception of the oyster shell to be broken. At one end of the base there are mounted the uprights 12, and formed in the bottom of the channel of the base, and extending transversely thereof, between the uprights, is a slot 13, to which reference will be made later herein. Pivotally mounted, at one end, on one of the uprights 12, and extending toward the other upright, is an arm 14. Secured to the uprights, and extending therebetween, is a bar 15, through which are formed the vertical openings 16 and 17, and slidably disposed through the opening 16 is a plunger 18, the upper end of which is connected with the arm 14 by means of the link 19. Encircling the plunger, between the arm 14 and the bar 15, is a coil spring 20, which serves to urge the arm 14 upwardly, to hold the lower knife end 20', of the plunger well above the base. The outer end of the arm 14 is curved or bowed upwardly, as shown at 21, and has pivotally connected to its end a depending link 22. Pivotally connected to the lower end of this link 22 is the upper end of a guide rod 23, which is slidably disposed through the opening 16, of the bar 15. Encircling this rod 23, and bearing against the link 22 and the bar, is a coil spring 24.

Pivotally connected to the other upright 12 is one end of a lever 25, the same extending toward the first upright, above the arm 14, the free end of the lever being formed with a suitable handle 26, to be grasped by the operator for movement of the lever downward. Carried by the lever 25, adjacent its pivotal end, is a roller 27 which is adapted to bear on the upper face of the bowed portion of the arm, to force the same downwardly, and the knife end of the plunger 18 into cutting relation to the shell of an oyster placed in the channel of the base. As the knife moves down through the oyster shell, it passes into the slot 13, of the base. Upon release of the lever 25, the springs 20 and 24 cause the arm 14, the rod 23 and plunger 18, to be elevated, for the purpose of pushing the oyster from beneath the knife, and permitting the placing of another oyster in the channel, in position to be cut or broken by the knife. Of course, as the arm moves upwardly, under the influence of the springs 20 and 24, the lever 25 will also be elevated, ready for the next down-stroke.

This particular arrangement of the arm 14 and lever 25, permits of considerable force being applied to the plunger, to more effectively and quickly break off the proper amount of the shell of the oyster, and thereby form an opening or crack within which the next operator may easily introduce a knife to pry open the shell.

By swinging the lever 25 over toward the left in Figure 2, and then swinging the arm 14 upwardly until the bolt 19' is above the upper end of the spring 20, the bolt may be removed, so that the knife 18 may be withdrawn for repairs and sharpening.

What is claimed is:

1. An oyster punching machine including a channeled base having a transverse elongated opening adjacent one end, uprights on the base adjacent the ends of the opening, a transverse bar having a pair of vertical openings and being secured to and extending between the uprights, an arm pivotally mounted on one of the uprights and extending longitudinally over the said bar, the outer end of the arm being upwardly bowed, a plunger provided with a knife at its lower end, slidable through one of the openings of the bar and being pivoted to the said arm, a coil spring on the plunger between the arm and bar, a guiding rod slidable through the other opening of the bar and having its upper end pivoted to the outer end of the arm, a coil spring on the guide rod between the arm and the bar, and a lever pivotally supported on the other upright and having a rollered projection engaged with the bowed portion.

2. An oyster punching machine, including a base, a knife pivotally mounted on the base, a lever also mounted on the base for operating the knife and movable pivotally arranged guiding means for the knife.

3. An oyster punching machine including a base, an arm carried by the base, a knife carried by the arm, guiding means for the knife, supplemental guiding means for the knife, and a lever carried by the base for operating the knife.

4. An oyster punching machine including a base, an arm movably carried by the base, a knife pivotally carried by the arm, and means having slidable connection with the arm for operating the same.

5. An oyster punching machine including a base, an arm carried by the base, a knife carried by the arm, supplemental guiding means for the knife and means contacting with the arm for operating said knife.

6. An oyster punching machine including a base, uprights carried by the base, a knife carried by one of the uprights, supplemental guiding means for the knife, and a lever carried by the other upright for operating the knife.

7. An oyster punching machine including a base, uprights carried by the base, an arm pivotally carried by one of the uprights, a knife carried by the arm, and means carried by the other upright and arranged for slidable contact with the arm whereby to operate the said knife.

8. An oyster punching machine including a base, uprights carried by the base, an arm pivotally carried by one of the uprights, a knife carried by the arm, supplemental guiding means for the knife also carried by the arm, and a lever carried by the other upright and arranged for slidable contact with the arm.

9. An oyster punching machine including a base, uprights on the base, a bar secured to and extending between the uprights and provided with a pair of openings, an arm pivotally mounted on one of the uprights, a plunger provided with a knife slidable through one of the openings of the bar and being connected to said arm, a guiding rod slidable through the other opening of the bar and connected to the said arm, means for normally urging the said arm away from the base, and means having slidable contact with said arm for operating the same.

10. An oyster punching machine, including a base, uprights on the base, a bar secured to and extending between the uprights, an arm pivotally mounted on one of the uprights, a plunger provided with a knife at its free end slidable through the bar and connected with said arm, a guide rod slidable through the said bar and connected to the arm, and a lever pivotally supported on the other upright and engageable with the arm and movable independently thereof for operating the same.

In testimony whereof, I affix my signature, in the presence of a witness.

LEARY DICKERSON.

Witness:
NATHAN CAYTON.